US009846315B2

(12) United States Patent
Avivi et al.

(10) Patent No.: US 9,846,315 B2
(45) Date of Patent: Dec. 19, 2017

(54) ELECTROMAGNETIC ACTUATORS FOR DIGITAL CAMERAS

(71) Applicant: Corephotonics Ltd., Tel-Aviv (IL)

(72) Inventors: Gal Avivi, Haifa (IL); Ephrahim Goldenberg, Ashdod (IL); Jamil Nasser, Haifa (IL); Gil Bachar, Tel-Aviv (IL); Gal Shabtay, Tel-Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 15/256,691

(22) Filed: Sep. 5, 2016

(65) Prior Publication Data

US 2016/0370601 A1 Dec. 22, 2016

Related U.S. Application Data

(63) Continuation of application No. 14/373,490, filed as application No. PCT/IB2014/062836 on Jul. 3, 2014, now Pat. No. 9,448,382.

(Continued)

(51) Int. Cl.
*G02B 7/02* (2006.01)
*G02B 27/64* (2006.01)
(Continued)

(52) U.S. Cl.
CPC ............. *G02B 27/646* (2013.01); *G02B 7/04* (2013.01); *G02B 7/08* (2013.01); *G03B 3/10* (2013.01);
(Continued)

(58) Field of Classification Search
CPC ... G11B 7/0908; G11B 7/0925; G11B 7/0927; G11B 7/093; H02K 41/0356; G02B 7/04
(Continued)

(56) References Cited

U.S. PATENT DOCUMENTS 5,557,444 A 9/1996 Melville et al.
8,018,819 B2 9/2011 Murari et al.
(Continued)

FOREIGN PATENT DOCUMENTS

CN 101477237 A 7/2009
JP S54 104826 8/1979
(Continued)

OTHER PUBLICATIONS

English translation of the Chinese Office Action dated Jan. 4, 2017.
(Continued)

*Primary Examiner* — William Choi
(74) *Attorney, Agent, or Firm* — Nathan & Associates Patent Agents Ltd; Menachem Nathan

(57) ABSTRACT

Electro-magnetic actuators used to provide a displacement of an optical element such as a lens carrier comprise at least one ferromagnetic frame associated with a large air gap and at least one ferromagnetic member parallel to and separated from an elongated section of a frame by a small air gap. Actuation causes a magnetic circuit that appears in the at least one frame, the at least one member and small air gaps and by-passes or bridges the large air gap. In some embodiments, the resultant magnetic force moves the at least one member and leads to the displacement of an optical element attached thereto. In some embodiments, at least one frame and at least one member are arranged to provide a center hole and are dimensioned to enable insertion of a lens carrier in the hole. In some embodiments, the displacement is for auto-focus. In other embodiments, the displacement is for optical image stabilization.

17 Claims, 14 Drawing Sheets

Related U.S. Application Data

(60) Provisional application No. 61/900,442, filed on Nov. 6, 2013.

(51) Int. Cl.

| | | |
|---|---|---|
| *G03B 3/10* | (2006.01) | |
| *G02B 7/08* | (2006.01) | |
| *G03B 5/00* | (2006.01) | |
| *G02B 7/04* | (2006.01) | |
| *G11B 7/09* | (2006.01) | |
| *H02K 41/035* | (2006.01) | |
| *H02K 1/12* | (2006.01) | |
| *H02K 1/34* | (2006.01) | |
| *H02K 3/04* | (2006.01) | |
| *H02K 7/14* | (2006.01) | |

(52) U.S. Cl.
CPC ............... *G03B 5/00* (2013.01); *G11B 7/093* (2013.01); *G11B 7/0908* (2013.01); *G11B 7/0925* (2013.01); *G11B 7/0927* (2013.01); *H02K 1/12* (2013.01); *H02K 1/34* (2013.01); *H02K 3/04* (2013.01); *H02K 7/14* (2013.01); *H02K 41/0356* (2013.01); *G03B 2205/0069* (2013.01)

(58) Field of Classification Search
USPC ................................. 359/819, 822, 823, 824
See application file for complete search history.

(56) References Cited

U.S. PATENT DOCUMENTS

| | | |
|---|---|---|
| 8,731,390 B2 | 5/2014 | Goldenberg et al. |
| 2007/0223903 A1 | 9/2007 | Ho et al. |
| 2011/0148554 A1 | 6/2011 | Cho et al. |
| 2015/0029601 A1 | 1/2015 | Dror et al. |
| 2015/0085174 A1 | 3/2015 | Shabtay et al. |

FOREIGN PATENT DOCUMENTS

| | | |
|---|---|---|
| JP | 2005 284212 | 10/2005 |
| WO | 201310512 A2 | 7/2013 |
| WO | 2014199338 A2 | 12/2014 |
| WO | 2015001519 A2 | 1/2015 |
| WO | 2015015383 A2 | 2/2015 |

OTHER PUBLICATIONS

PCT/IB2014/062836 Search Report of the international search authority, dated Mar. 2015.

ELECTROMAGNETIC ACTUATORS FOR DIGITAL CAMERAS

CROSS REFERENCE TO RELATED APPLICATIONS

This application is a Continuation application of U.S. patent application Ser. No. 14/373,490 filed Jul. 21, 2014 (issued as U.S. Pat. No. 9,448,382), which claims priority from U.S. Provisional Patent Application No. 61/900,442 having the same title and filed Nov. 6, 2013, which is incorporated herein by reference in its entirety.

FIELD

Embodiments disclosed herein relate in general to electromagnetic (EM) actuators having ferromagnetic members and conductive coils and more particularly to EM actuators used in miniature cameras.

BACKGROUND

In its basic form, an electronic camera, such as digital still camera or a camera embedded in a mobile (cell) phone or in a tablet computer includes two components: (1) a lens module comprising a set of one or more plastic or glass lens elements and used to create an optical image of the viewed scene, and (2) an image sensor (e.g. CMOS or CCD), which converts the optical image to the electronic domain, where the image can be processed and stored There are different types of electronic (or digital) cameras ranging by application (e.g., regular SLR, camera-phone, automotive, security and medical) and by functionality (e.g., with or without auto-focus). The simplest cameras are those in which the lens module is fixed in position with respect to the image sensor. These cameras are often called fixed-focus cameras, where the camera is focused to a pre-determined distance. Objects that fall within the depth of field of the camera can be captured sharply and those which fall beyond the depth of field will be blurred. In more advanced cameras, the position of the lens module (or at least one lens element in the lens module) can be changed by means of an actuator and the focus distance can be changed in accordance with the captured object or scene. In these cameras it is possible to capture objects from a very short distance (e.g., 10 cm) to infinity. Some advanced camera designs may include different groups of lenses that can move with respect to each other and hence change the effective focal length of the camera, which results in optical zoom capability. The trend in digital still cameras is to increase the zooming capabilities (e.g. to 5x, 10x or more) and, in cellphone cameras, to decrease the pixel size and increase the pixel count. These trends result in greater sensitivity to hand-shake or in a need for longer exposure time. This has created a need for optical image stabilization (OIS), which now appears in advanced cameras. In OIS-enabled cameras, the lens or camera module can change its lateral position or tilt angle in a fast manner to cancel the hand-shake during the image capture.

In compact (miniature) camera modules, the most ubiquitous form of an actuator is the Voice-Coil Motor (VCM), which includes a coil (wire turned on a cylinder), fixed (or "permanent" or "hard") magnets and springs. When current is driven through the coil, an electro-magnetic (EM) force is applied and the lens module changes position. While the VCM is considered a mature technology, it is costly, large in size, uses rare-earth magnets, is slow in operation and consumes high power. Therefore, there is a need for, and it would be advantageous to have technical advances which overcome the shortcomings of VCM and related technologies.

SUMMARY

Embodiments disclosed herein teach EM actuators for miniature camera (as exemplarily in smart phones) autofocus (AF) and OIS, as well as for any other functionality that can be obtained by tilting or moving a camera module or elements therewithin. The actuation force is magnetic, using ferromagnetic materials. Actuator structures disclosed herein include at least one ferromagnetic frame with frame arms and at least one ferromagnetic member, the arms and members having operating surfaces, the operating surfaces facing each other across air gaps. In some embodiments, the frame or frames are stationary, while the member or members are movable. Therefore, a relative movement occurs between the ferromagnetic frame(s) and ferromagnetic (member(s), where an optical element mechanically coupled to the member or members moves relative to the stationary frame(s). Note that while the description below follows focusses in general on embodiments in which the ferromagnetic frame(s) is/are stationary and the member(s) is/are moving, other embodiments may have the frame moving (and coupled to the optical element) while the member(s) are stationary. Yet other embodiments may have combinations of moving/stationary frame and member parts Each actuator structure includes at least one large air gap in a magnetic circuit that includes all the frame parts. Each large air gap is either by-passed or bridged through smaller air gaps between arms and members by the magnetic field developing during operation. The actuator structures are designed to reduce the magnetic reluctance of the actuator and thereby provide a large EM force. Typically, the reluctance changes significantly with movement in a first ("force/actuation") direction, while in a second ("indifferent") direction, in-plane and orthogonal to the first direction, the reluctance is hardly changed or unchanged with movement.

In some embodiments there are provided electro-magnetic actuators used to move an optical element, comprising a ferromagnetic first frame that includes a core surrounded partially by a first conductive coil, a first arm and a second arm, each arm having an operative surface and an end surface, the first and second arms separated therebetween by a first large air gap, and a ferromagnetic first member having a respective operative surface and facing the first arm, the first member and the first arm disposed such that a first small air gap and an overlap are formed between their respective operative surfaces, wherein the first small air gap is smaller than the first large air gap, wherein the first member and the first frame undergo a relative movement therebetween when a magnetic force is generated by current in the coil, and wherein the movement is convertible into a displacement of the optical element from a first position to a second position.

In an embodiment, the frame may have a G-shape and the first member may have two operative surfaces and be nested between the two arms, each first member operative surface facing a respective operative surface of an arm across a respective small air gap.

In an embodiment, the actuator may further comprise a ferromagnetic second member rigidly coupled to the first member, the second member having a respective operative surface and facing the second arm, the second member and the second arm disposed such that a second small air gap and an overlap are formed between their respective operative surfaces, wherein the second small air gap is smaller than the first large air gap.

In an embodiment, the actuator may further comprise a ferromagnetic second frame that includes a second frame core surrounded partially by a second conductive coil, the second frame having first and second frame arms separated therebetween by a second large air gap, each second frame arm having at least one operative surface and an end surface, wherein the first member faces a first pair of arms formed by a first frame arm and a second frame arm, wherein the second member faces a second pair of arms formed by a first frame arm and a second frame arm, each of the first and second members and their respective facing first and second pairs of arms disposed such that a small air gap and an overlap are formed between their respective operative surfaces, wherein each small air gap is smaller than either the first or second air gaps, and wherein each member and its respective pair of arms undergo a relative movement therebetween when a magnetic force is generated by current in each of the first and second coils, the movement convertible into a displacement of the optical element from a first position to a second position. The first and second frames may be dimensioned to provide an internal open space that can accommodate the optical element,

BRIEF DESCRIPTION OF THE DRAWINGS

Non-limiting embodiments are herein described, by way of example only, with reference to the accompanying drawings, wherein.

DETAILED DESCRIPTION

Figure 1A:
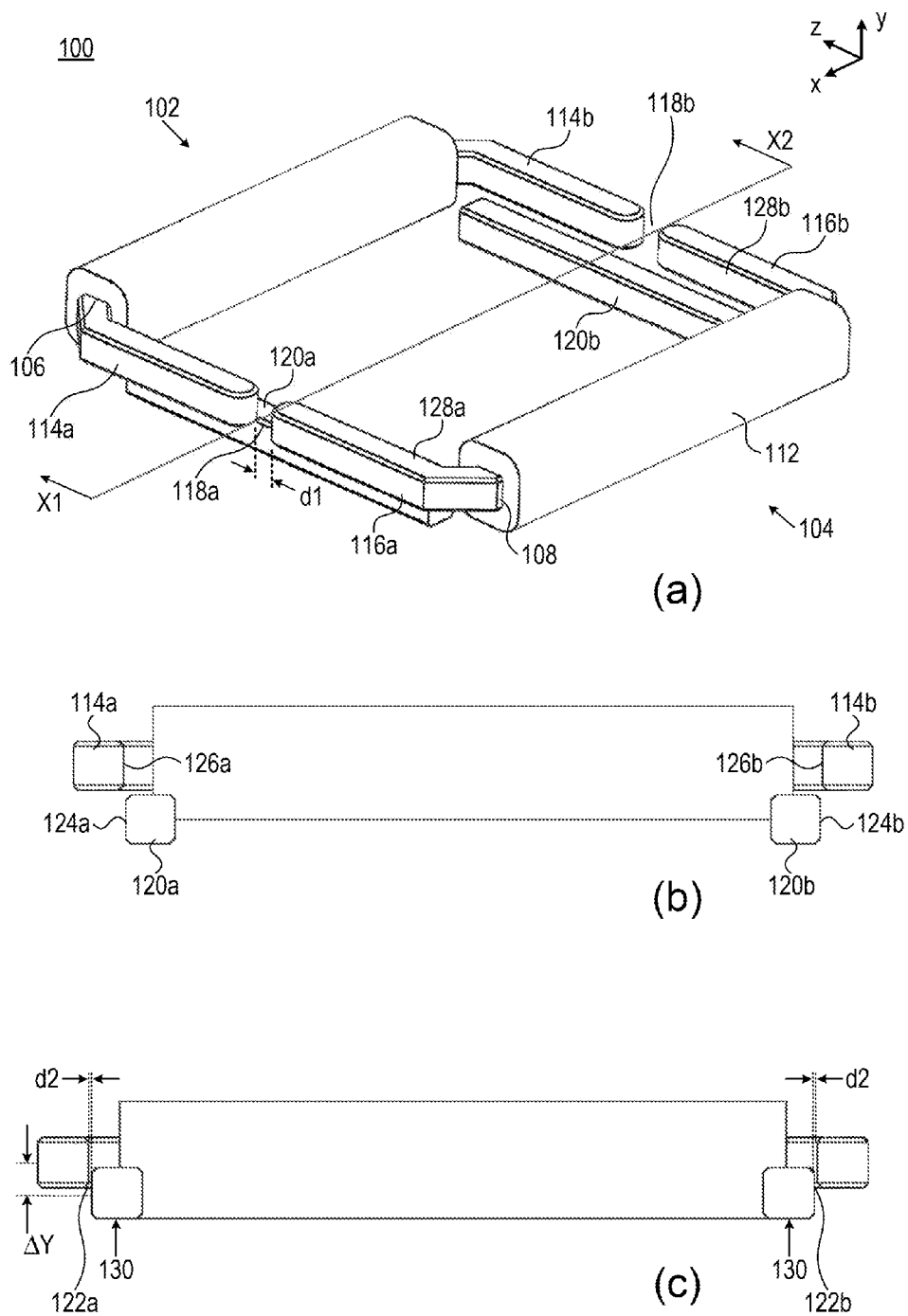
FIG. 1A shows an embodiment of an EM actuator disclosed herein in (a) an isometric view, (b) a cross section $X_1$-$X_2$ in a relaxed state, and (c) a cross section $X_1$-$X_2$ in an operative state.

FIG. 1A shows an embodiment of an EM actuator disclosed herein and numbered 100 in (a) an isometric view, (b) a cross section $X_1$-$X_2$ in a relaxed state, and (c) a cross section $X_1$-$X_2$ in an operative state. The X-Y-Z coordinate system shown in FIG. 1A holds for all other figures described below. Actuator 100 comprises two U-shaped ferromagnetic frames (henceforth referred to simply as "frames"), a first frame 102 and a second frame 104. The two frames are arranged substantially in-plane (exemplarily the X-Z plane) in a "double-U" configuration. The structure of this actuator (as well as of the actuators of FIGS. 2-10 below) has therefore a central open space ("hole"), marked here as 105. The hole is designed to enable insertion of a lens carrier. Frames 102 and 104 are fixed (e.g. rigidly constrained to a support structure (see 1212 in FIG. 12(b)). Each frame includes an elongated base member (core) (respectively 106 and 108) surrounded at least partially by a coil (respectively 110 and 112), and two arms (respectively 114a and 114b for member 102 and 116a, 116b for member 104). Opposite arms of the two frames (i.e. 114a and 116a, and 114b and 116b) face each other across a large air gap (respectively, air gaps 118a and 118b). Actuator 100 further comprises two moving elongated ferromagnetic members (also referred to simply as "moving members") 120a and 120b substantially parallel to the frame arms. In this and following embodiments, the moving members may be rigidly connected to each other (by a structure not shown) to move in unison relative to the frames. The lens carrier (see e.g. carrier 1204 in FIG. 12) would be mechanically coupled to the moving members. Member 120a is parallel to arms 114a and 116a and is separated from them by a small air gap 122a. Member 120b is parallel to arms 114b and 116b and is separated from them by another small air gap 122b. Each of moving members 120a and 120b has an operative surface facing a respective operative surface of opposite fixed arms across the respective second air gap. Thus, member 120a has an operative surface 124a facing operative surfaces 126a and 128a of, respectively, arms 114a and 116a. Member 120b has an operative surface 124b facing operative surfaces 126b and 128b of respectively, arms 114b and 116b.

Figure 1B:
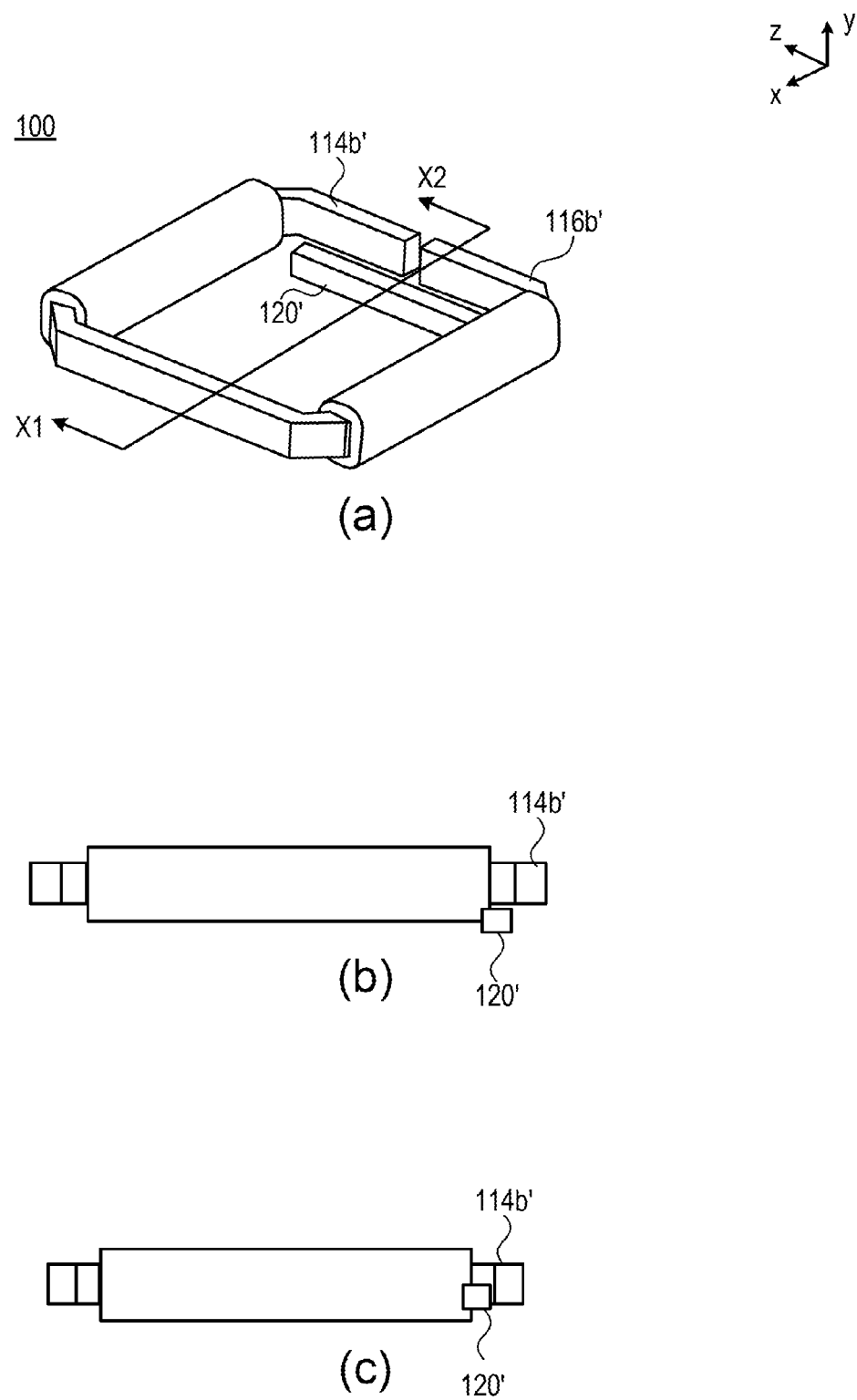
FIG. 1B shows another embodiment of an EM actuator disclosed herein in (a) an isometric view, (b) a cross section $X_1$-$X_2$ in a relaxed state, and (c) a cross section $X_1$-$X_2$ in an operative state.

FIG. 1B shows another embodiment of an EM actuator disclosed herein and numbered 100' in (a) an isometric view, (b) a cross section $X_1$-$X_2$ in a relaxed state, and (c) a cross section $X_1$-$X_2$ in an operative state. Actuator 100' is similar to actuator 100 in that it may comprise the same elements, except that is includes a single moving elongated ferromagnetic member 120' (instead of the two moving members 120a and 120b). Exemplarily, any unnumbered element in actuator 100' may be considered as identical with a parallel element in actuator 100. As in actuator 100, member 120' is substantially parallel to one set of the frame arms (e.g. as shown, 114b' and 116b'). Such a single moving member configuration may have advantages in terms of less magnetic resistance, i.e. a larger output force relative to the same input power.

In all embodiments below, large air gaps are marked as having a width $d_1$ while small air gaps are marked as having a width $d_2$. Exemplarily, the dimensions of an actuator 100 or 100' may be about 10 mm×10 mm×2 mm. Exemplarily, the ferromagnetic arms and members may have a cross section of about 1×1 mm². Exemplarily, the large air gaps have the same width $d_1$. In actuators such as actuators 100 or 100' above and similar ones below, $d_1$ may be on the order of 0.5 mm. In other actuators below, $d_1$ may be between about 0.5 and a few mm. Exemplarily, the small air gaps have a same width $d_2$. In all embodiments, $d_2$ is much smaller than $d_1$. For example, $d_2$ may be one or two orders of magnitude smaller than $d_1$. Exemplarily in some embodiments, $d_2$ may be about 30 μm. In other embodiments, $d_2$ may exemplarily be in the range 10-30 μm In operation, when current passes through the coils, an EM field develops in a closed loop formed by the U-frame arms and the moving members. The field lines propagate through the small air gaps and not through the large air gaps, because of the difference in first and small gap sizes. In other words, during operation of the actuator of FIG. 1 (as well as of those of FIGS. 2, 3 and 6-10), the magnetic flux passes mainly through the small air gap(s) and by-passes the large air gap(s). The resulting magnetic force F moves the moving members in a direction Y indicated by arrows 130 parallel to the operating surfaces and perpendicular to the X-Z plane. F is approximately proportional to $S(I \times N)^2/(B+d)$ where I is the current, N is the number of coil turns, B is a constant determined by the particular structure of the actuator and d is the gap width ($d_2$). To a first approximation, the EM force in this configuration depends essentially only on the current (i.e. is independent of position). The operative surfaces slide relative to each other with a displacement Δy occurring in the Y direction. Exemplarily, Δy may vary between 0 and 1000 μm. The displacement provides an overlap area SΔy, where S is the length of the overlap. The overlap area is minimal in the relaxed state, FIG. 1b, and increases in an operative state to a maximal overlap, FIG. 1c, which represents a "closed state". Note that the movement direction is the same in all the embodiments of FIGS. 1-9.

Advantageously, the long overlap between the arms and the moving members and the small air gap between the operative surfaces of the arms and those of the moving members increase the actuator force/power ratio. This ratio can be further increased by an increase in the number of coil turns. As mentioned, the moving members are rigidly interconnected, so side forces (in the X-Z plane) perpendicular to the linear movement direction cancel out. Alternatively, each moving member may have two opposing operative surfaces so the side forces cancel out (as in FIGS. 4 and 11). Note that in this and any of the following embodiments, operative surfaces facing each other may be straight (parallel to Y) or tilted across the air gap, or be non-flat (i.e. curved). Such features can control and/or shape the magnetic reluctance change during movement and result in an ability to shape the EM force behavior as a function of location of the moving member.

Figure 2:
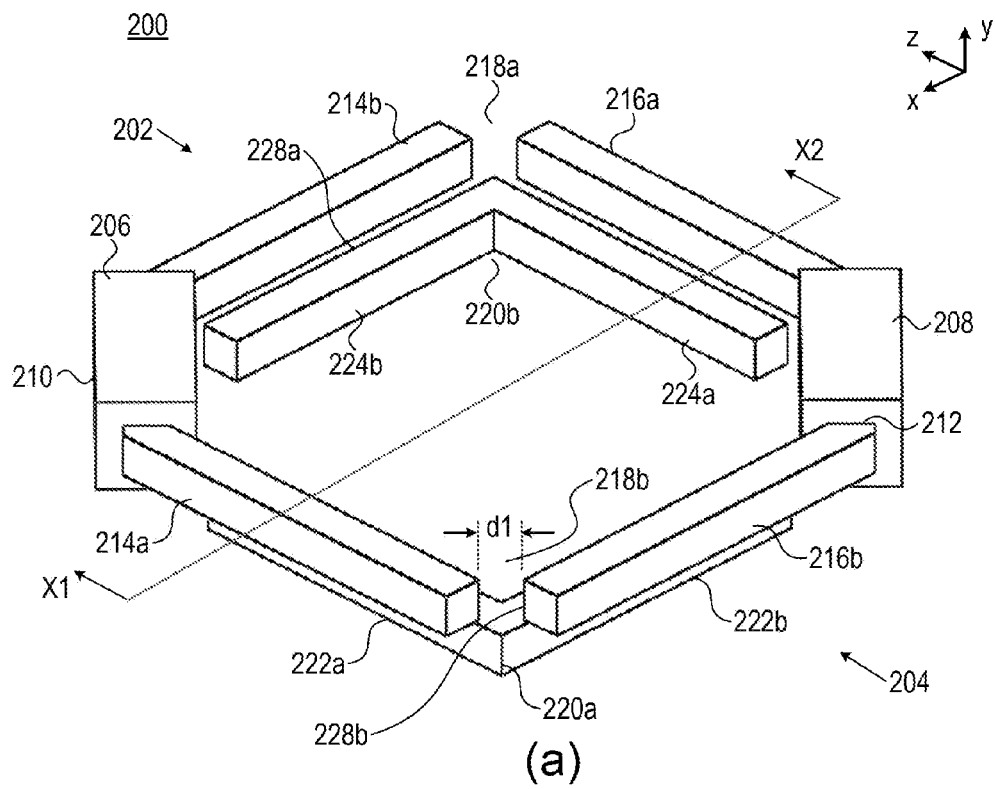
FIG. 2 shows yet another embodiment of an EM actuator disclosed herein in (a) an isometric view, (b) a cross section $X_1$-$X_2$ in a relaxed state, and (c) a cross section $X_1$-$X_2$ in an operative state.
Figure 2:
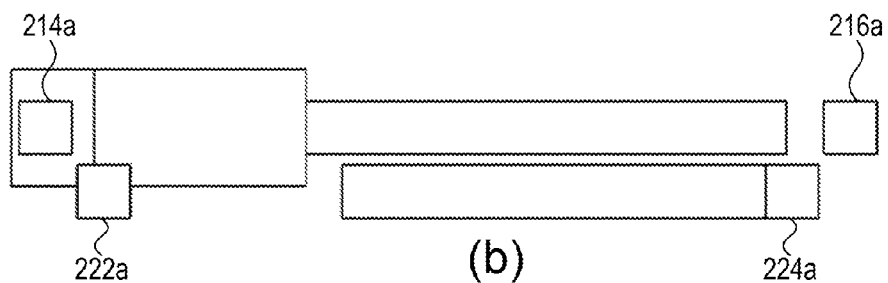
Figure 2:
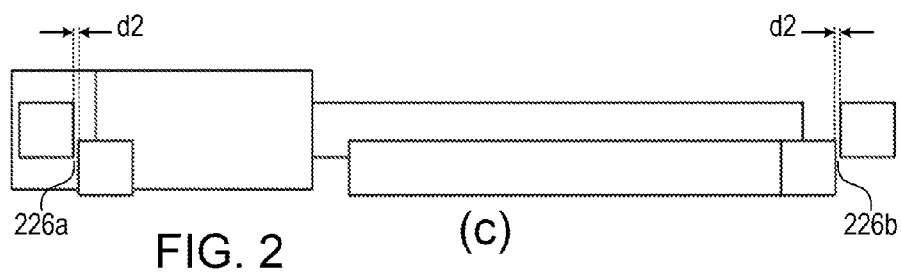

FIG. 2 shows another embodiment of an EM actuator disclosed herein and numbered 200 in (a) an isometric view, (b) a cross section $X_1$-$X_2$ in a relaxed state, and (c) a cross section $X_1$-$X_2$ in an operative state. Actuator 200 comprises two L-shaped frames 202 and 204 arranged substantially in the X-Z plane, and is termed accordingly a "double-L" configuration. The L-shaped frames are fixed (e.g. mechanically constrained to another structure, not shown). Each L-shaped frame includes a corner ferromagnetic member (respectively 206 and 208) surrounded at least partially by a coil (respectively 210 and 212). Each frame further includes two arms (respectively 214a and 214b for corner member 206 and 216a and 216b for corner member 208) fixedly joined to (or structurally integral with) the respective corner member. In actuator 200, the two arms of each L-shaped frame are perpendicular to each other and form a 45° angle with the respective corner member. Note that other "approximate L-shape" geometries in which the arms are not perpendicular to each other and form an angle different than 45° with the corner member are possible. Free ends of arms 214b and 216a face each other across a large air gap 218a. Free ends of arms 214a and 216b face each other across a large air gap 218b. Note that large air gaps 218a and 218b are narrowest (with a width $d_1$) at internal corners formed between the ends of the arms of frames 202 and 204. Actuator 200 further comprises two L-shaped ferromagnetic moving members 220a and 220b. These members are "nested" either inside or outside frames 202 and 204. In actuator 200, the L-shaped members are nested inside the L-shaped frames such that arm 222a of member 220a and arm 224b of member 220b are parallel to arms 214a and 214b of frame 202, and arms 222b of member 220a and 224a of member 220b are parallel to arms 216a and 216b of frame 204. The parallel arms of the L-frames and the L-shaped members are separated by small air gaps. Thus, arms 214a and 222a are separated by a gap 226a (exemplarily with width $d_2$), 216a and 224a are separated by a gap 226b (exemplarily also with width $d_2$). Similarly, 214b and 224b are separated by a gap 228a, and 216b and 222b are separated by a gap 228b. L-shaped members 220a and 220b may be rigidly connected to each other to move in unison. Each of the arms has an operative surface facing a respective operative surface of an opposite arm across the respective second air gap. The operative surfaces may be smooth and planar, or smooth and structured, e.g. in a wavy form.

In an embodiment, the large air gaps have the same width $d_1$ and the small air gaps have a same width $d_2$ different from $d_1$. $d_1$ is significantly larger (for example by an order of magnitude) than $d_2$. The operation and movement of actuator 200 are similar to those of actuator 100. In particular, during operation, most of the magnetic flux passes through the small air gaps and by-passes the large air gaps.

Figure 3:
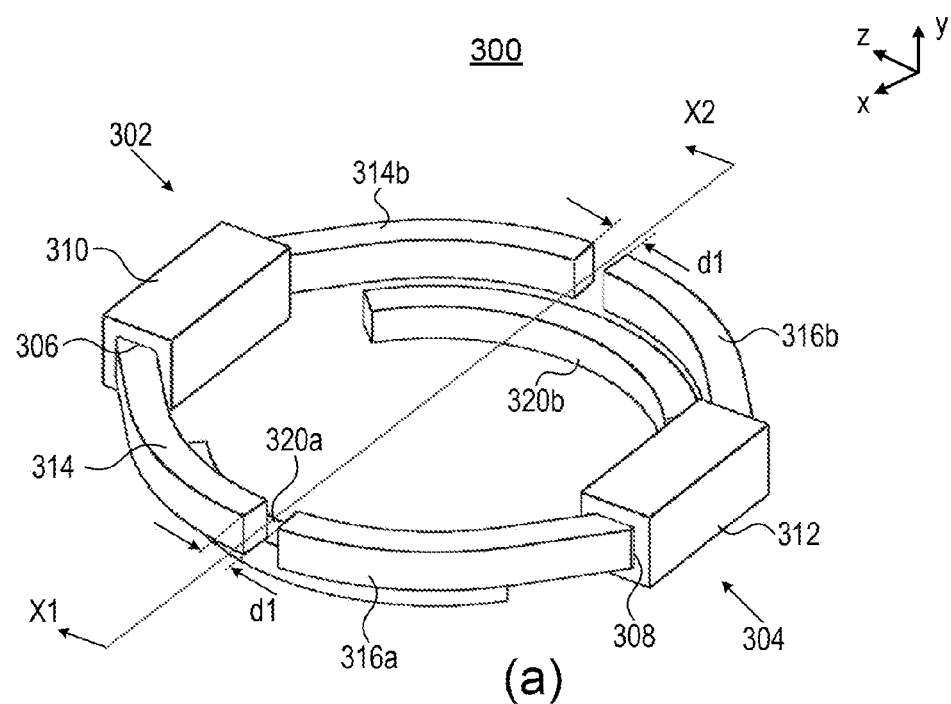
FIG. 3 shows yet another embodiment of an EM actuator disclosed herein in (a) an isometric view, (b) a cross section $X_1$-$X_2$ in a relaxed state, and (c) a cross section $X_1$-$X_2$ in an operative state.
Figure 3:
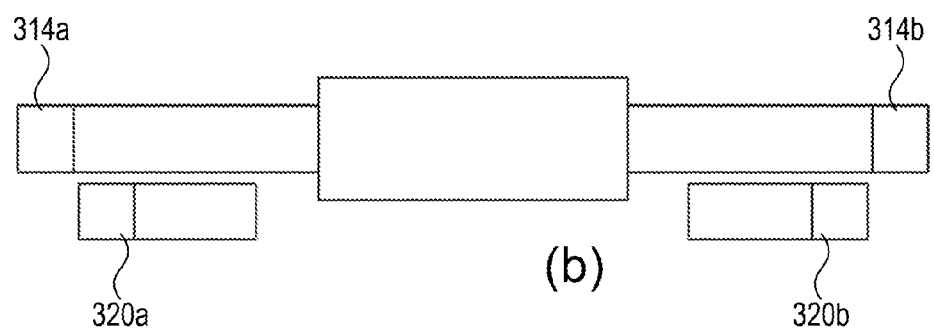
Figure 3:
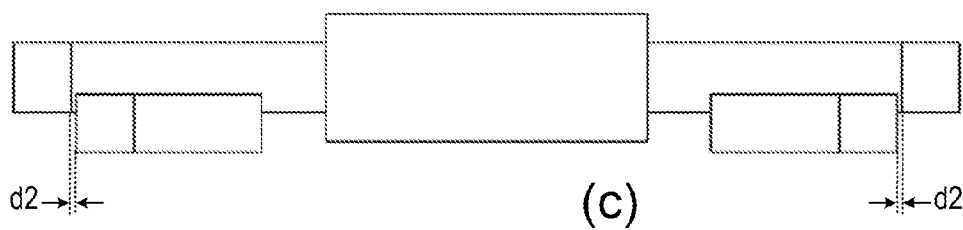

FIG. 3 in an isometric view shows yet another embodiment of an EM actuator disclosed herein and numbered 300 in (a) an isometric view, (b) a cross section $X_1$-$X_2$ in a relaxed state and (c) a cross section $X_1$-$X_2$ in an operative state. Actuator 300 is similar to actuator 200, except that the L-shaped frames and members are replaced by semicircular-shaped frames and members. Therefore, aspects of design and operation that can be inferred from the description of actuator 200 above are not described in detail for actuator 300. Actuator 300 comprises two fixed semicircular frames 302 and 304 arranged substantially in the same plane, each frame including a core section (respectively 306 and 308)

surrounded at least partially by a coil (respectively 310 and 312) and two curved arm sections (respectively 314a and 314b for frame 302 and 316a and 316b for frame 304). Free ends of the curved arm sections face corresponding free ends of opposite curved arm sections across large air gaps (with width $d_1$). Actuator 300 further comprises two semicircular members 320a and 320b, which may be positioned either inside or outside the frames. Members 320a and 320b may have the same curvatures as the curved arm sections, and are separated from them by small air gaps (with width $d_2$). The curved arm sections and the semicircular members have operative surfaces facing each other across the respective small air gaps. The large and small air gaps are dimensioned such that when current passes through the coils, the EM field exists in the curved arm sections and the semicircular members. The resulting EM force F moves the semicircular members in a direction Y parallel to the operating surfaces and perpendicular to the X-Z plane, providing a linear movement parallel to operative surfaces in the Y direction.

Note that the "semicircular" shape described is exemplary, and that other curved shapes such semi-elliptical, semi-oval, etc. may be used for both the frames and the ferromagnetic members, as long as the small air gaps formed therebetween ensure that the EM force formed when currents pass through the coils moves the ferromagnetic members in a direction parallel to the operative surfaces.

Figure 4:
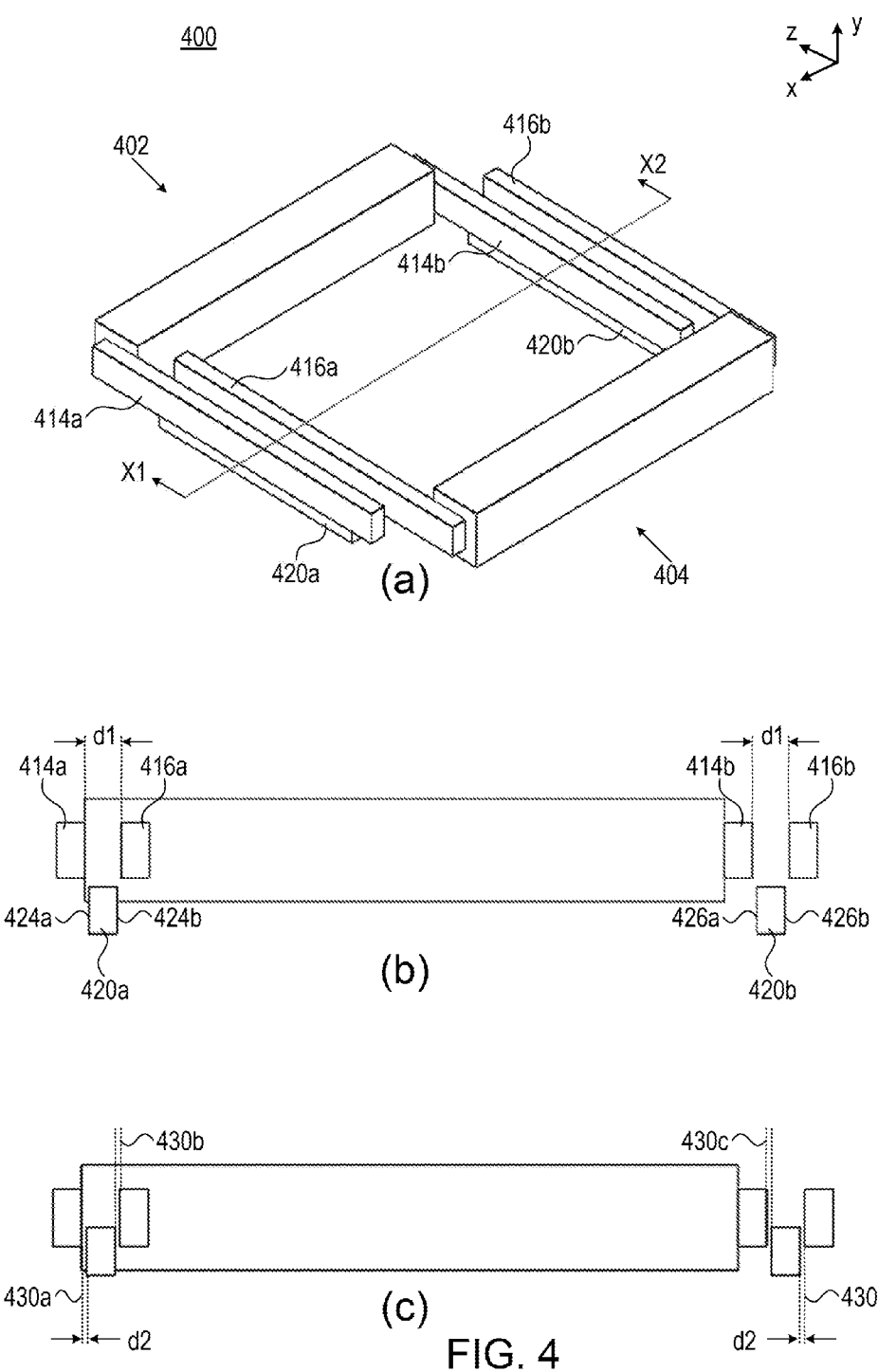
FIG. 4 shows yet another embodiment of an EM actuator disclosed herein in (a) an isometric view, (b) a cross section $X_1$-$X_2$ in a relaxed state, and (c) a cross section $X_1$-$X_2$ in an operative state.

FIG. 4 shows in an isometric view yet another embodiment of an EM actuator disclosed herein and numbered 400 in (a) an isometric view, (b) a cross section $X_1$-$X_2$ in a relaxed state and (c) a cross section $X_1$-$X_2$ in an operative state. Similar to actuator 100, actuator 400 comprises two U-shaped frames 402 and 404 arranged substantially in the same (X-Z) plane but shifted relative to each other to form a "double-U interlaced" configuration. Actuator 400 further comprises two elongated moving members 420a and 420b. Frames 402 and 404 and moving members 420a and 420b are substantially similar to, respectively, frames 102 and 104 and members 120a and 120b in FIG. 1. However, because of an X-shift and a Z-shift of the frames, moving members 420a and 420b are now positioned between the arms of the U-frames. Thus, member 420a is positioned between and in parallel with arm 414a of frame 402 and arm 416a of frame 404. Member 420b is positioned between and in parallel with arm 414b of frame 402 and arm 416b of frame 404. Moving members 420a and 420b have each two operative surfaces (424a and 424b for member 420a, and 426a and 426b for member 420b) facing across respective air gaps (430a,b for member 420a and 430c,d for member 420b) operative surfaces of the neighboring frame arms. A major advantage of this embodiment is that the overlap area between two frame arms and a moving member is doubled vs. that in embodiment 100, so that side forces (in the X-Z plane) are inherently canceled out.

The operation and movement are similar to those of actuators 100-300. Note however that the large air gap ($d_1$) in this case is between pairs of nearest frame arms. The actuation involves magnetic field bridging of the large direct gap through the arms of the two frames and the small air gaps ($d_2$).

Figure 5:
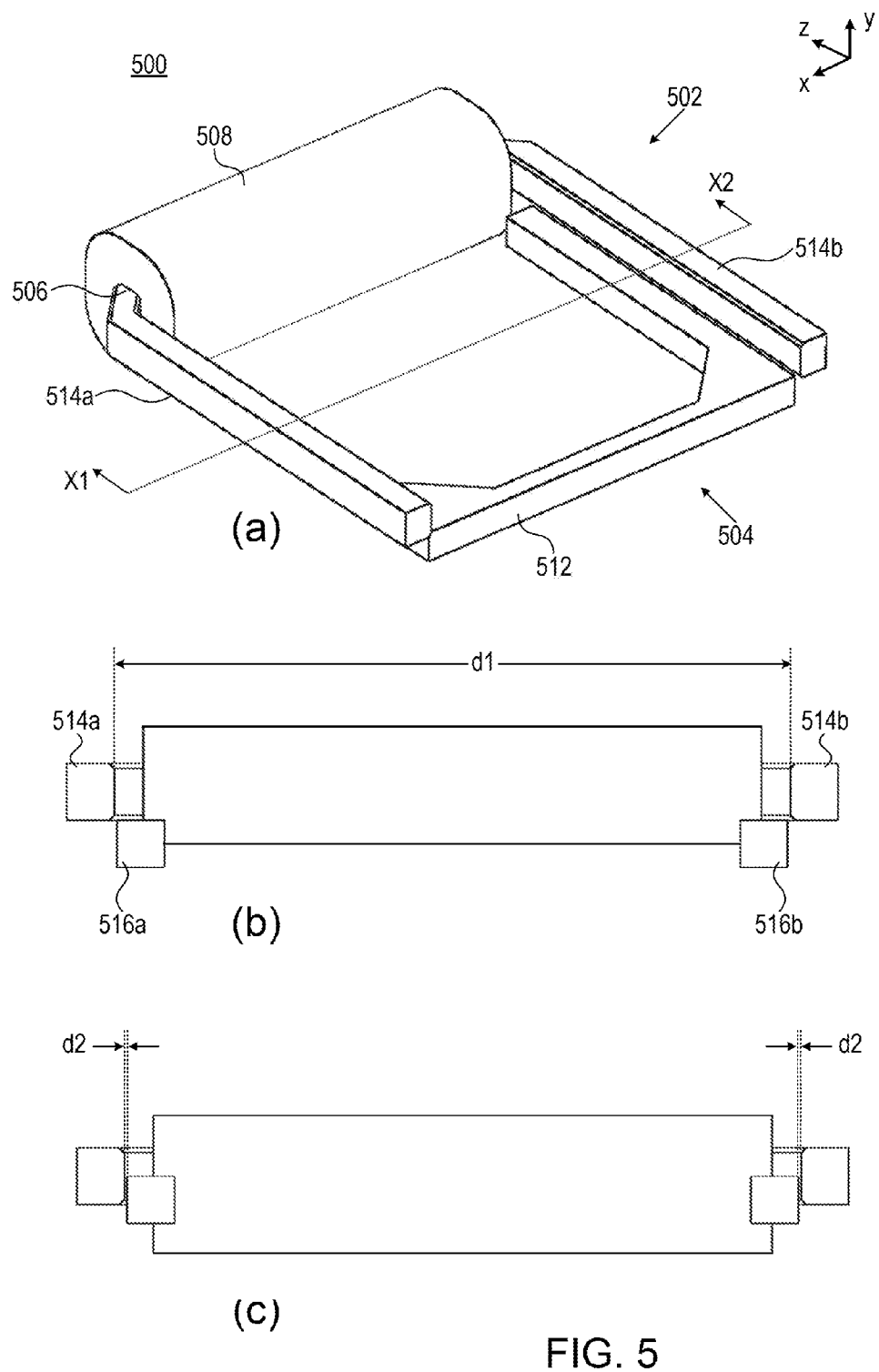
FIG. 5 shows yet another embodiment of an EM actuator disclosed herein in (a) an isometric view, (b) a cross section $X_1$-$X_2$ in a first operative state, and (c) a cross section $X_1$-$X_2$ in a second operative state.

FIG. 5 shows an embodiment of another EM actuator disclosed herein and numbered 500 in (a) an isometric view, (b) a cross section $X_1$-$X_2$ in a relaxed state and (c) a cross section $X_1$-$X_2$ in an operative state. Actuator 500 includes a fixed U-shaped frame 502 and a moving U-shaped frame 504. Frame 502 includes an elongated base member 506 surrounded at least partially by a coil 508 and two arms 514a and 514b separated by a large "direct" gap (with a width $d_1$). Frame 504 includes an elongated base member 512 and two arms 516a and 516b. Frame 504 is nested inside frame 502 such that operative surfaces of pairs of arms 514a and 516a and 514b and 516b face each other across small air gaps of width $d_2$. Clearly, $d_1$ is much larger than $d_2$ (for example, by an order of magnitude). As in actuator 400, the actuation involves magnetic field bridging of the large direct gap through the arms of the two frames and the small air gaps.

Figure 6:
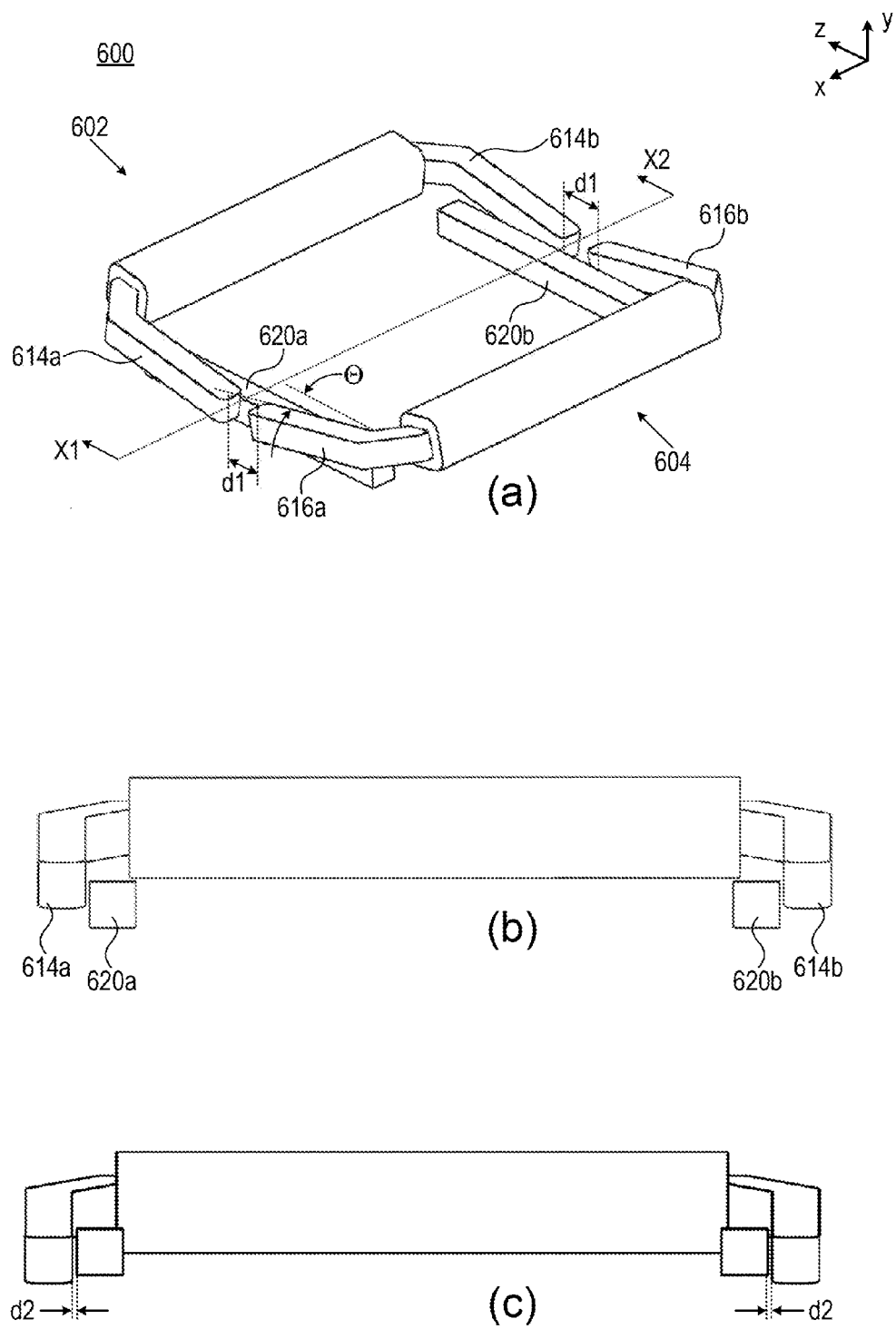
FIG. 6 shows yet another embodiment of an EM actuator disclosed herein in (a) an isometric view, (b) a cross section $X_1$-$X_2$ in a relaxed state, and (c) a cross section $X_1$-$X_2$ in an operative state.

FIG. 6 shows in an isometric view yet another embodiment of an EM actuator disclosed herein and numbered 600 in (a) an isometric view, (b) a cross section $X_1$-$X_2$ in a relaxed state, and (c) a cross section $X_1$-$X_2$ in an operative state. Actuator 600 is similar to actuator 100, except that its two fixed U-shaped frames 602 and 604 are not co-planar (in-plane). Instead, the two frames have respective arms 614a, 614b (for frame 602), and 616a and 616b (for frame 604) inclined at an angle θ (typically smaller than 5°) to the XZ plane. The same inclination exists for moving elongated ferromagnetic members 620a and 620b, which move in the Y direction. The inclinations enable more flexibility in the increase in overlap of the operative surfaces as function of movement. As in previous embodiments, "$d_1$" marks large air gaps and "$d_2$" marks small air gaps.

Figure 7:
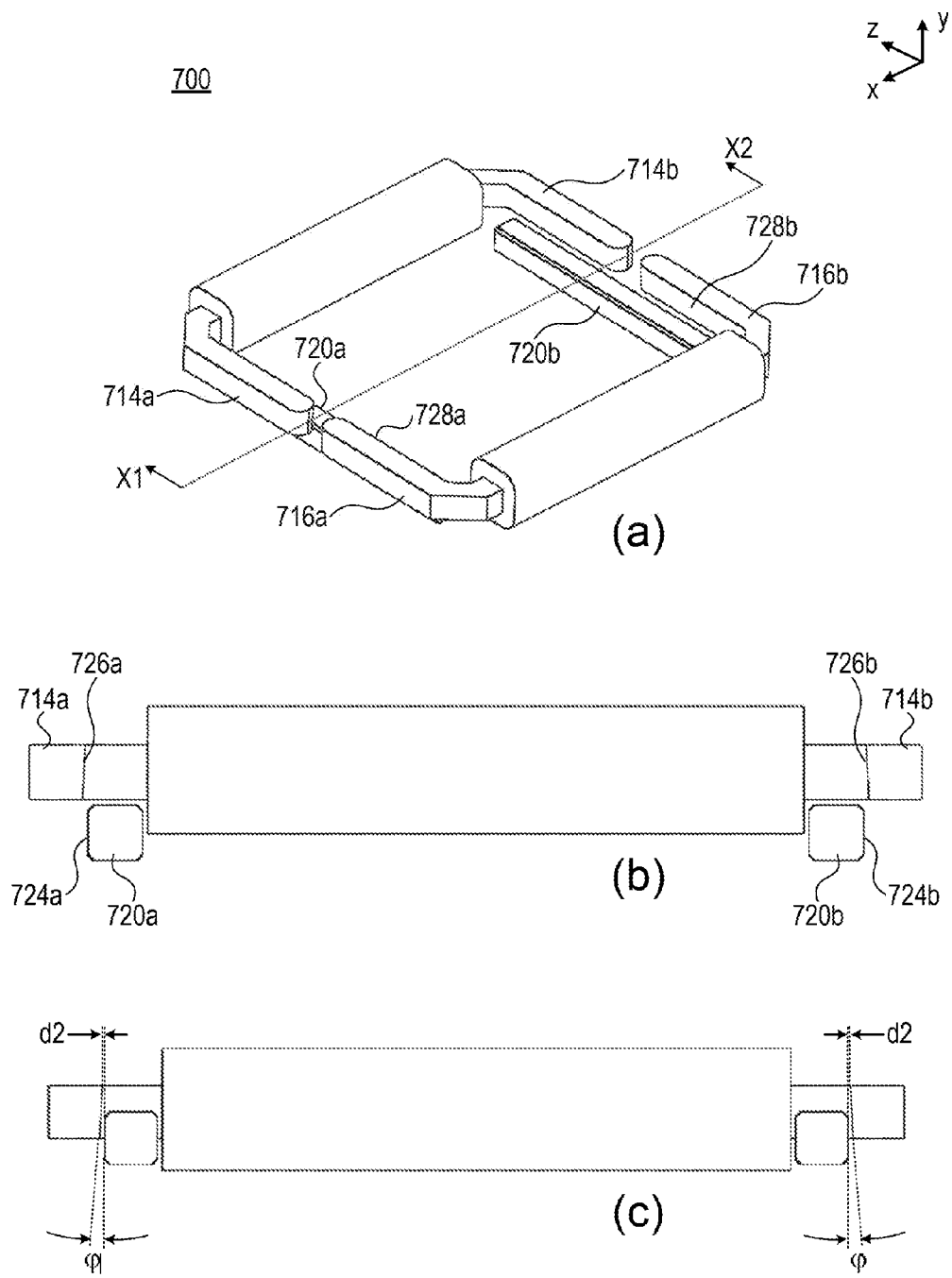
FIG. 7 shows an embodiment of an EM actuator disclosed herein and having tilted operative surfaces in (a) an isometric view, (b) a cross section $X_1$-$X_2$ in a relaxed state, and (c) a cross section $X_1$-$X_2$ in an operative state.

FIG. 7 shows an embodiment of an EM actuator disclosed herein and numbered 700 in (a) an isometric view, (b) a cross section $X_1$-$X_2$ in a first operative state, and (c) a cross section $X_1$-$X_2$ in a second operative state. Actuator 700 is substantially similar to actuator 100, except that arms 714a, 714b, 716a and 716b have tilted (to the Y-Z plane) operative surfaces (respectively 726a, 726b, 728a and 728b). Two moving elongated ferromagnetic members 720a and 720b have non-tilted (to the Y-Z plane) operative surfaces 724a and 724b. The tilt angle φ is typically 1-2° and maximally ca. 5°. The small air gaps ($d_2$) formed between facing operative surfaces are thus non-uniform in the movement direction. A non-uniform gap is advantageous in that it allows better engineering of forces during movement (in the Y direction).

Figure 8:
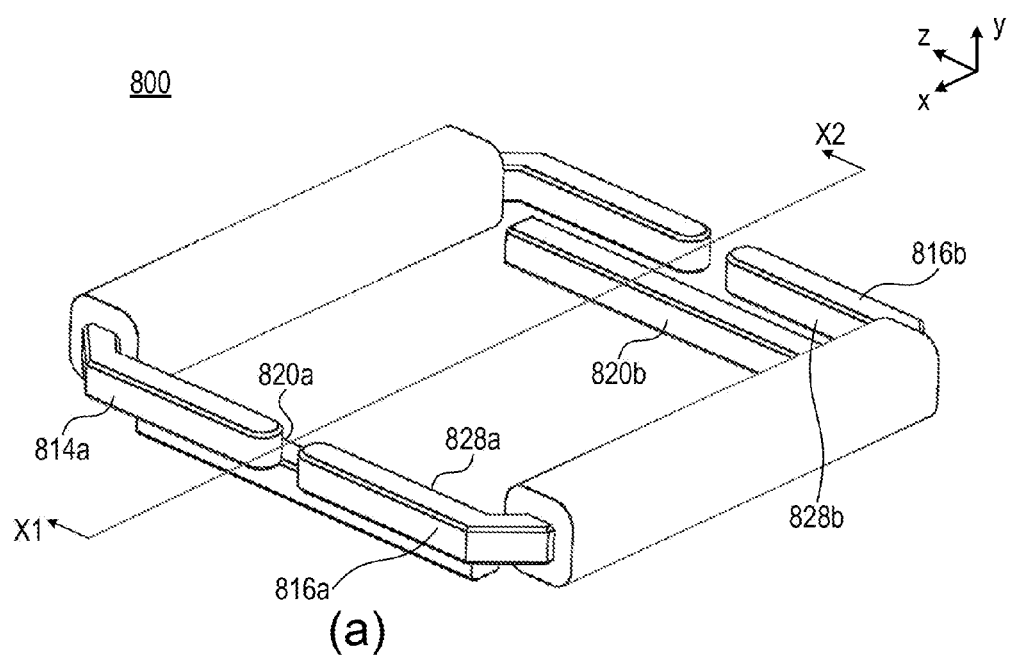
FIG. 8 shows another embodiment of an EM actuator disclosed herein and having tilted operative surfaces in (a) an isometric view, (b) a cross section $X_1$-$X_2$ in a relaxed state, and (c) a cross section $X_1$-$X_2$ in an operative state.
Figure 8:
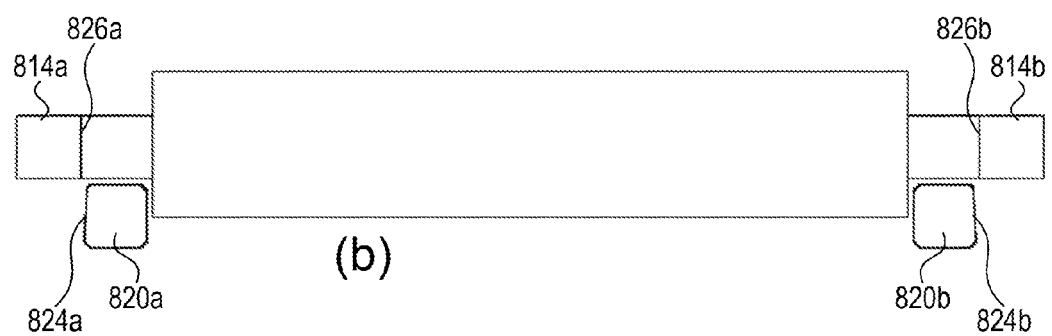
Figure 8:
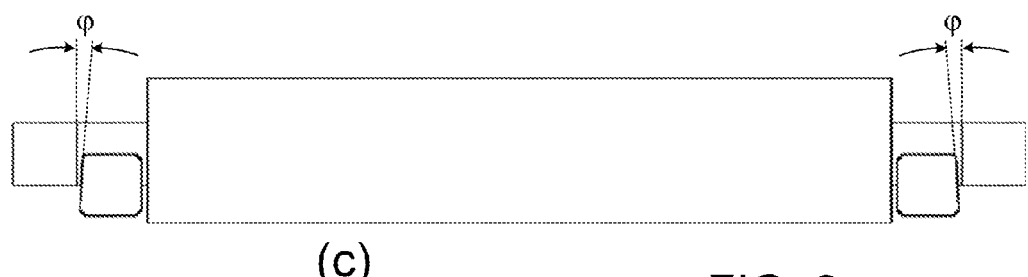

FIG. 8 shows an embodiment of an EM actuator disclosed herein and numbered 800 in (a) an isometric view, (b) a cross section $X_1$-$X_2$ in a first operative state, and (c) a cross section $X_1$-$X_2$ in a second operative state. Actuator 800 is substantially similar to actuator 100, in that arms 814a, 814b, 816a and 816b have non-tilted operative surfaces (respectively 826a, 826b, 828a and 828b). However, two moving elongated ferromagnetic members 820a and 820b have tilted (to the Y-Z plane with angle φ) operative surfaces 824a and 824b.

Figure 9:
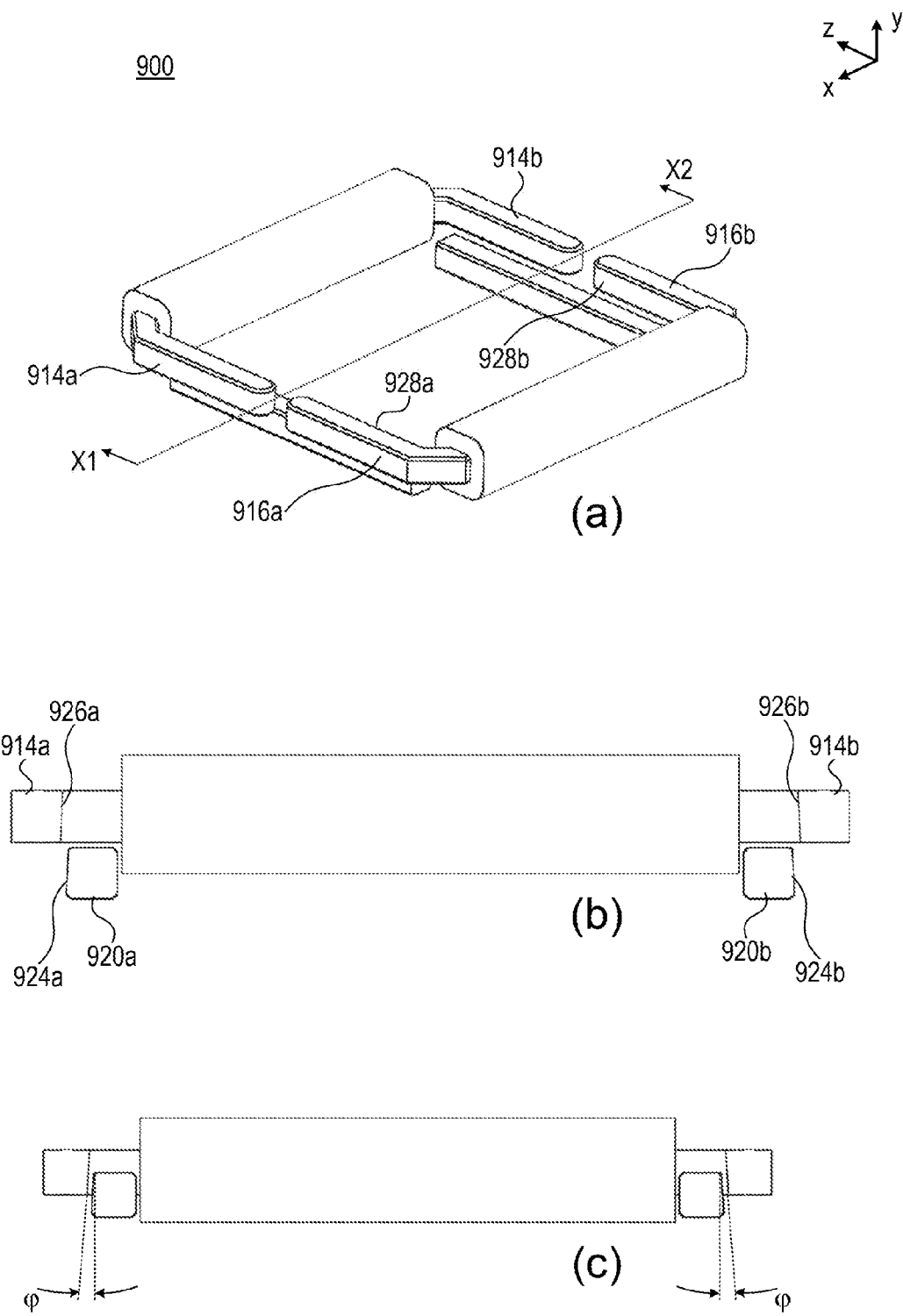
FIG. 9 shows yet another embodiment of an EM actuator disclosed herein and having tilted operative surfaces in (a) an isometric view, (b) a cross section $X_1$-$X_2$ in a relaxed state, and (c) a cross section $X_1$-$X_2$ in an operative state.

FIG. 9 shows an embodiment of an EM actuator disclosed herein and numbered 900 in (a) an isometric view, (b) a cross section $X_1$-$X_2$ in a first operative state, and (c) a cross section $X_1$-$X_2$ in a second operative state. Actuator 900 is substantially similar to actuator 100, except that arms 914a, 914b, 916a and 916b and moving elongated ferromagnetic members 920a and 920b have tilted (to the Y-Z plane with angle (p) operative surfaces. Thus, arms 914a, 914b, 916a and 916b have tilted operative surfaces (respectively 926a, 926b, 928a and 928b), while members 920a and 920b have tilted operative surfaces 924a and 924b.

While the designs of actuators 700-900 follow that of actuator 100, tilted operative surfaces disclosed in these embodiments may equally be implemented in any of actuators 200 to 600. Moreover, in designs where the operative surface of a moving member faces an operative surface of each of two arms, one of the arms may have a tilted operative surface while the other may have a non-tilted operative surface.

All actuator embodiments above may be used for linear movement (e.g. for focusing) of a lens. An actuator assembly embodiment disclosed in FIG. 13 (comprising 4 actuators as in FIG. 10 below) may be used for OIS.

Figure 10:
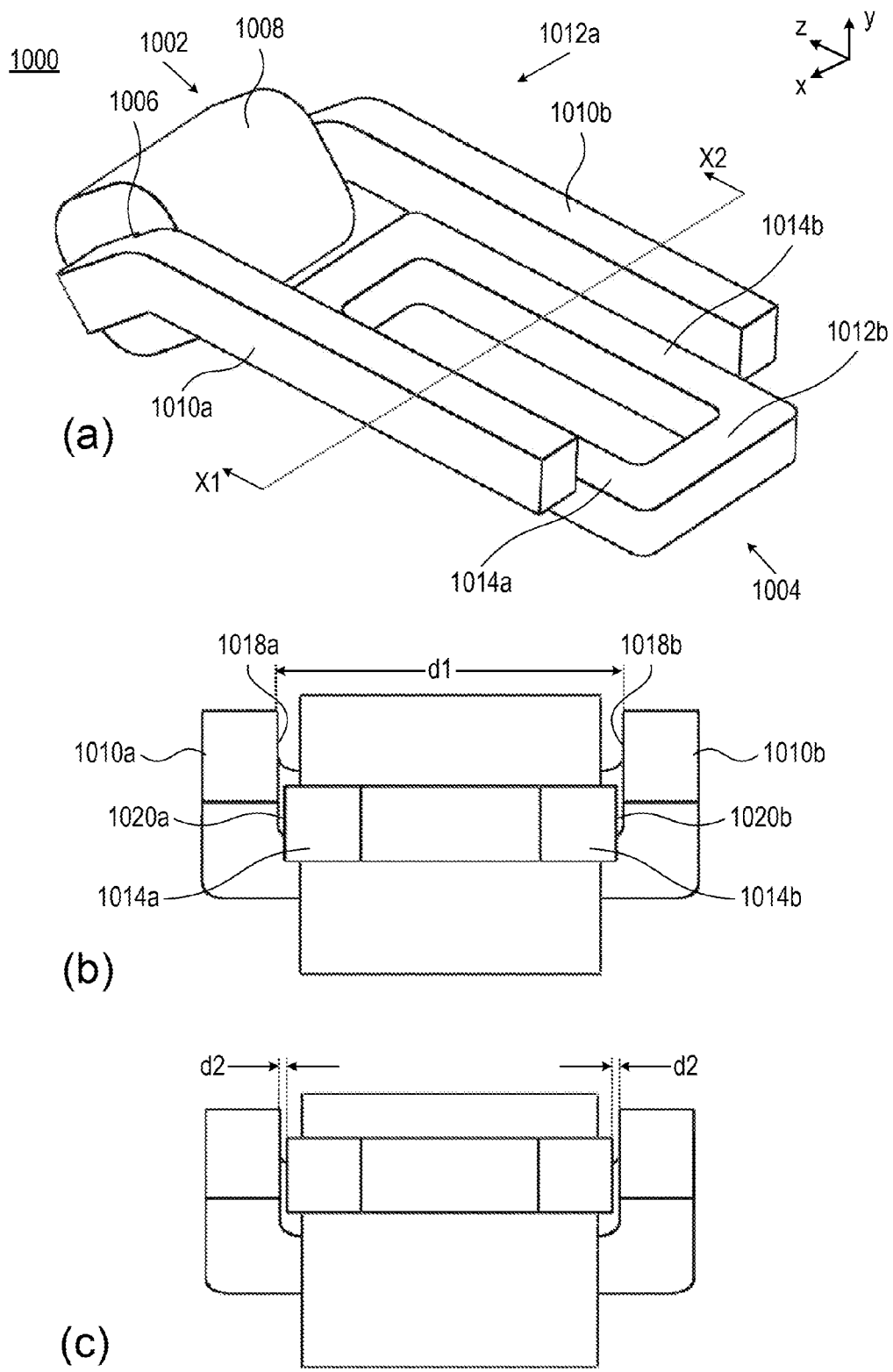
FIG. 10 shows an embodiment of an EM actuator for OIS disclosed herein in (a) an isometric view, (b) a cross section $X_1$-$X_2$ in a relaxed state, and (c) a cross section $X_1$-$X_2$ in an operative state.

FIG. 10 shows an embodiment of an EM actuator used for OIS disclosed herein and numbered 1000 in (a) an isometric view, (b) a cross section $X_1$-$X_2$ in a relaxed state and (c) a cross section $X_1$-$X_2$ in an operative state. Actuator 1000 comprises a first (e.g. fixed) frame 1002 and a second (e.g. moving) frame 1004. Frame 1002 includes an elongated core 1006 surrounded at least partially by a coil 1008, and two arms 1010a and 1010b. Arms 1010a and 1010b face each other across a large air gap $d_1$. Moving frame 1004 has a hollow rectangular shape, with two base members 1012a and 1012b and two arms 1014a and 1014b. Arms 1014a and 1014b are nested inside frame 1002 in the X-Z plane. Pairs of arms 1014a and 1010a and 1014b and 1010b are substantially parallel and separated along a length dimension by a small air gap $d_2$. Each arm has an operative surface bordering the small air gap. Thus, arm 1010a has an operative surface 1018a, arm 1010b has an operative surface 1018b, arm 1014a has an operative surface 1020a, and arm 1014b has an operative surface 1020b.

Since this actuator is used for OIS, it does not have to have a large hole that accommodates a lens carrier. Therefore, its width dimension (in the X direction) can be much smaller that in actuators 100-900, for example 3-4 mm (instead of 10 mm). This provides a very compact actuator, decreasing the requirements for actuator height and space.

In operation, current passing through coil 1008 induces a magnetic field through the magnetic circuit. Large gap $d_1$ is bridged by moving frame 1004 and through the small air gaps. The symmetry of the structures ensures that side forces (in the X-Z plane) are inherently canceled out. The movement of frame 1004 is substantially in the Y direction. Movement in the Z direction is not blocked. The combined action of four such actuators, shown in FIG. 13, is used to provide OIS.

Figure 11:
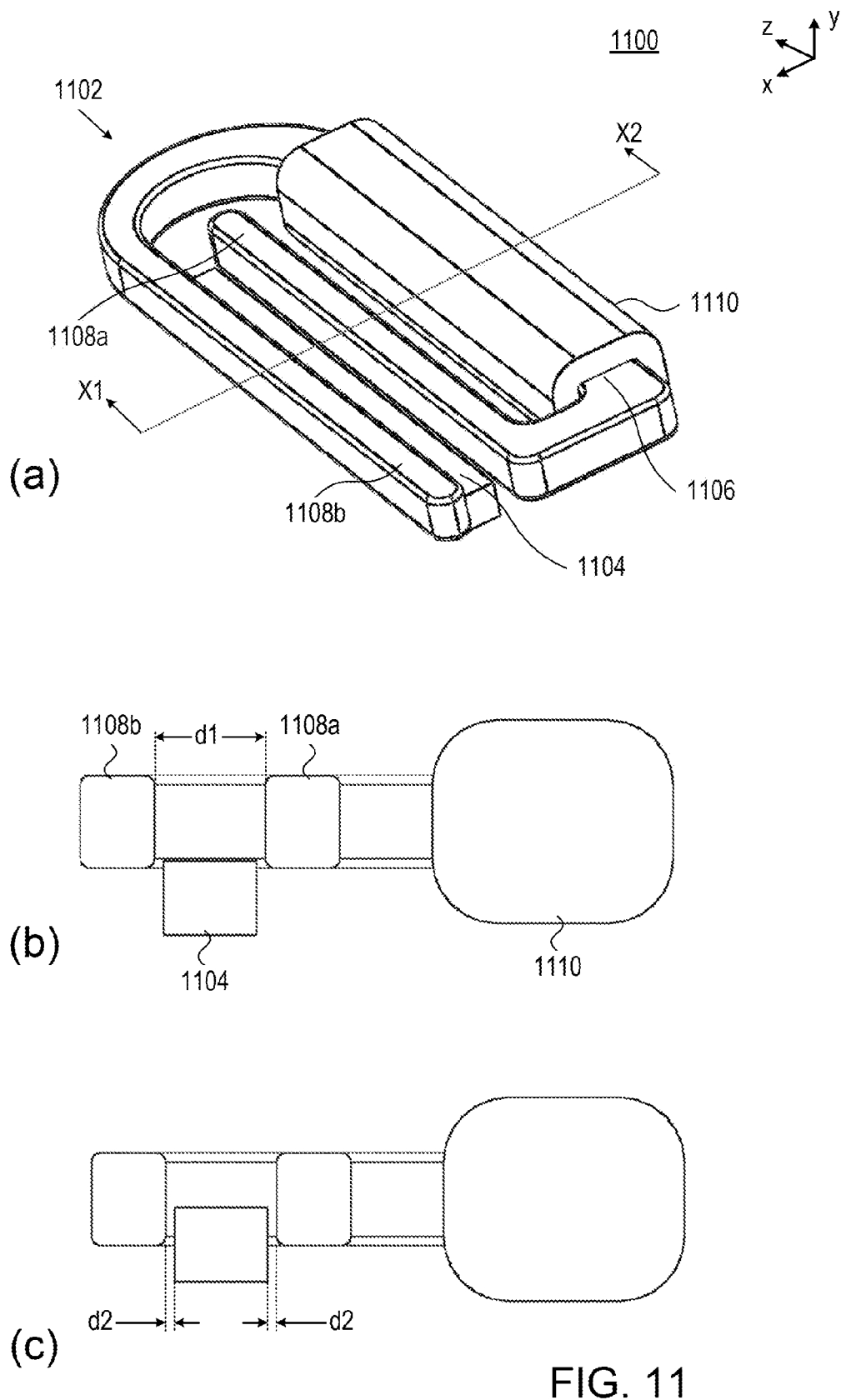
FIG. 11 shows another embodiment of an EM actuator for OIS disclosed herein in (a) an isometric view, (b) a cross section $X_1$-$X_2$ in a relaxed state, and (c) a cross section $X_1$-$X_2$ in an operative state.

FIG. 11 shows in an isometric view yet another embodiment of an EM actuator used for OIS disclosed herein and numbered 1100 in (a) an isometric view, (b) a cross section $X_1$-$X_2$ in a relaxed state, and (c) a cross section $X_1$-$X_2$ in a operative state. Actuator 1100 comprises a fixed ferromagnetic element 1102 shaped like capital letter "G" and referred to hereinafter as a "G-frame", and a moving elongated ferromagnetic member 1104. G-frame 1102 includes three substantially parallel elongated sections 1106, 1108a and 1108b. Section 1106 serves as core and it is surrounded at least partially by a coil 1110. Advantageously, coil 1110 may have a large volume (large number of coil windings). Sections 1108a and 1108b are separated by a large air gap $d_1$. Moving ferromagnetic member 704 is inserted between sections 1108a and 1108b and is separated from those sections by respective small air gaps $d_2$. Sections 1108a and 1108b and member 1104 have operative surfaces facing each other across the small air gaps. The operation and movement is similar to that of actuator 1000. Advantageously, the G-shape enables a long magnetic overlap between sections 1108a and 1108b and member 1104 and ensures that side forces (in the X-Z plane) are inherently canceled out. An exemplary width dimension of actuator 1100 is similar to that of actuator 1000, i.e. 3-4 mm.

Figure 12:
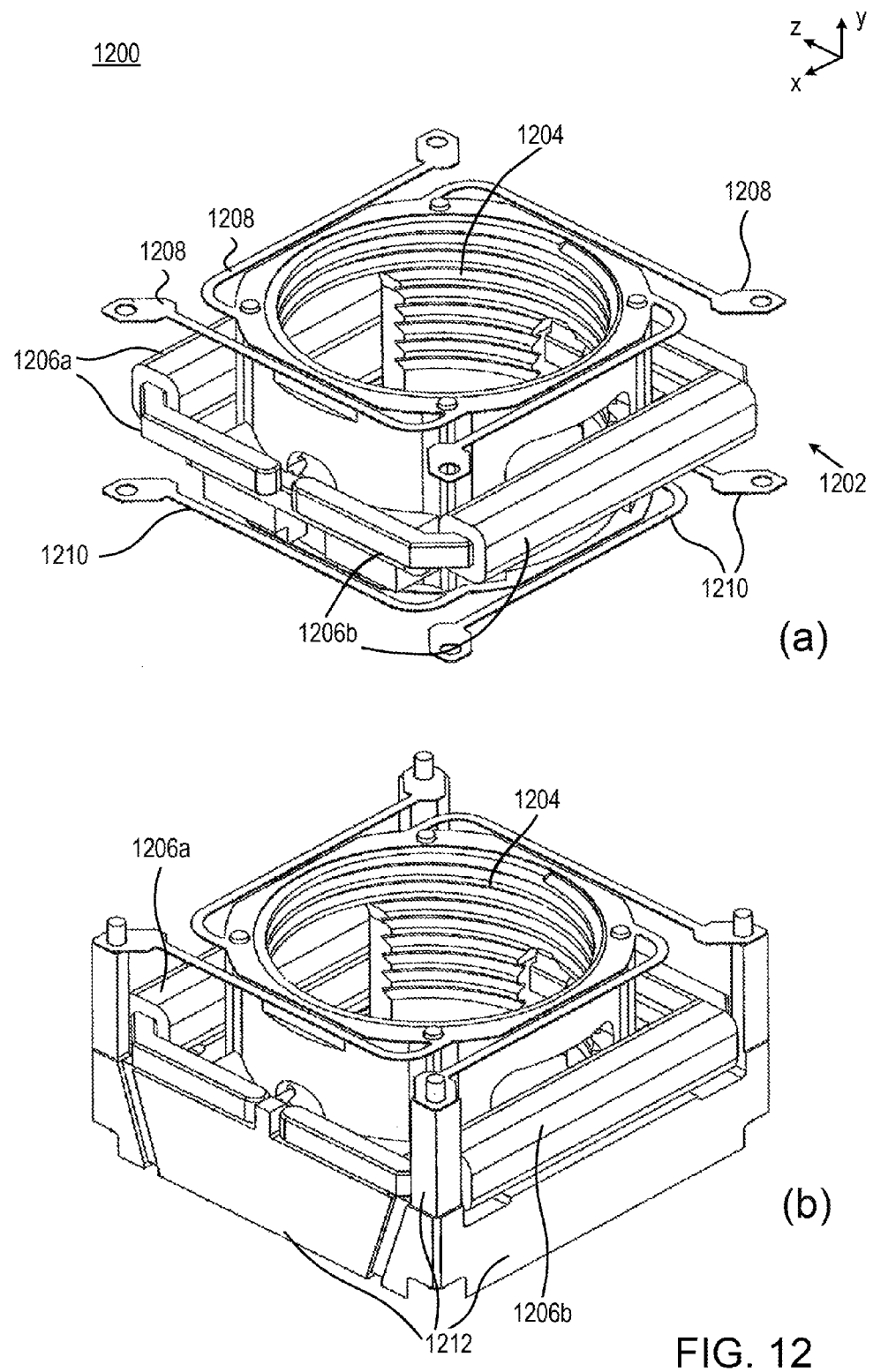
FIG. 12 shows schematically an embodiment of a camera module which includes an actuator assembly coupled to a lens carrier: (a) details showing two sets of springs coupled to the lens carrier, and (b) details showing a support structure for the actuator assembly and lens carrier.

FIG. 12 shows schematically an embodiment of a camera module 1200 that includes an actuator assembly 1202 coupled to a lens carrier 1204. Exemplarily, the dimensions of the camera module may be 10 mm×10 mm×6-7 mm. The actuator assembly includes two actuators 1206a and 1206b, which can be any of the actuators 100-900 above. All such actuators have the internal hole that enables insertion and movement therewithin of the lens carrier holder and an associated mounted lens block (not shown). FIG. 12(a) shows details of the camera module and in particular a top set of springs 1208 and a bottom set of springs 1210. FIG. 12(b) shows a support structure 1212 to which both sets of springs as well as the fixed frames of the actuator are rigidly coupled. Both sets of springs are rigidly coupled to the lens carrier 1204. Since the lens carrier moves with the moving part of the actuator, the springs serve as a counter force to the magnetic force in the movement direction Y. The lens carrier (and the lens attached thereto) can thus be positioned in any number of positions by a balance of the two forces.

Figure 13:
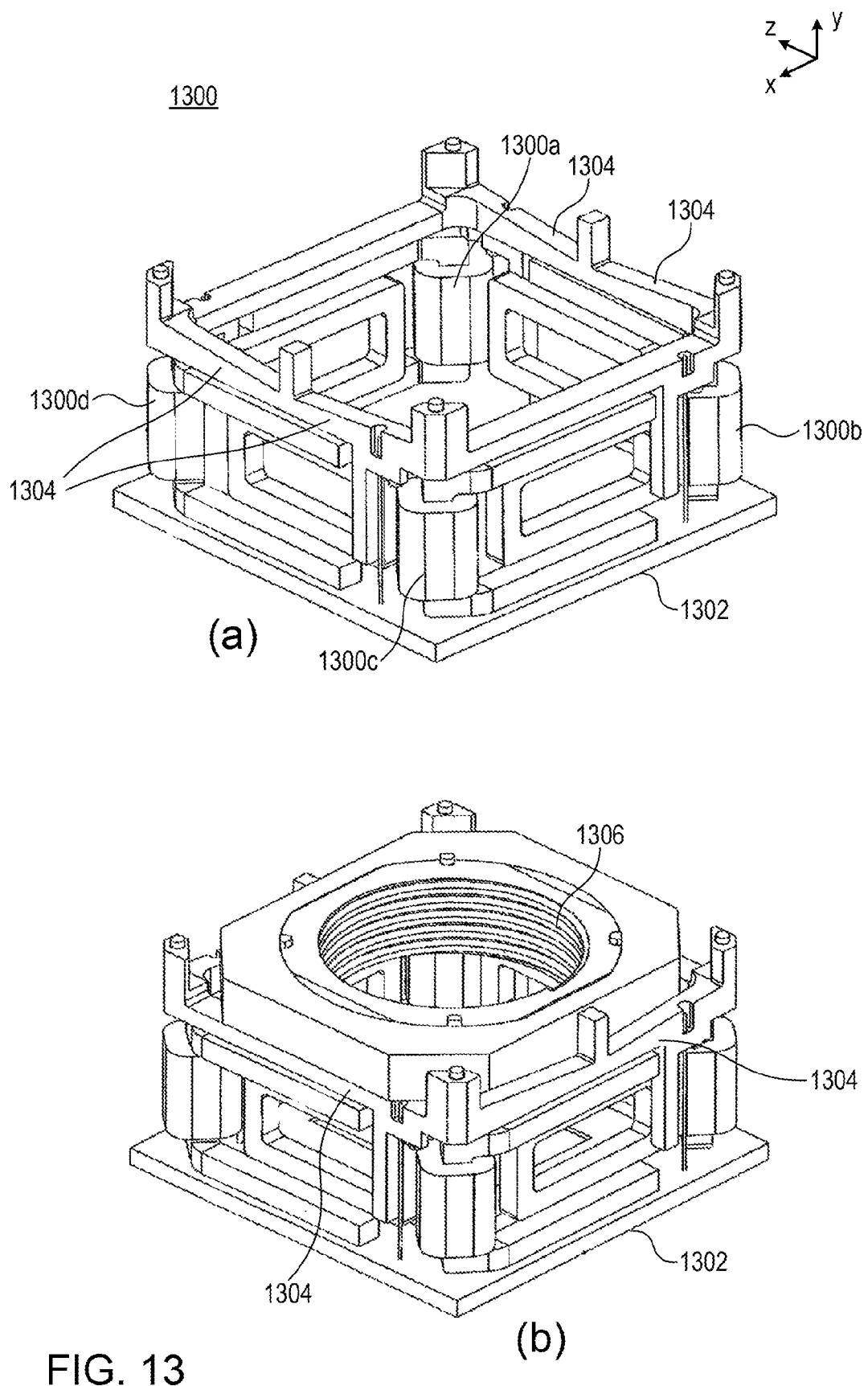
FIG. 13 shows schematically another embodiment of a camera module which includes an actuator assembly coupled to a lens carrier and used for OIS: (a) details showing two sets of springs, and (b) details showing a support structure for the actuator assembly and lens carrier.

FIG. 13 shows a camera module 1300 used for OIS. FIG. 13(a) provides details showing an actuator assembly structure with four actuators and two sets of springs, and FIG. 13(b) provides details showing a support structure for the actuator assembly and lens carrier. Four actuators similar to actuators 1000, labeled here 1300a-d, are positioned in a rectangular structure, with the fixed frames rigidly attached to four sides of a base structure 1302. The fixed frames of actuators 1300a and 1300c lie essentially in Y-X planes, while the fixed frames of actuators 1300b and 1300d lie essentially in Y-Z planes. The moving frames of actuators 1300a and 1300c can move along the Z-axis, while the moving frames of actuators 1300b and 1300d can move along the X-axis. The moving frames of all four actuators are mechanically coupled to a top flexible frame 1304, which in turn can be coupled to and accommodate a lens carrier 1306. Thus, a two-axis movement is made possible by the four actuators. The XZ movement of the lens can compensate for tilt movement of the complete camera.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A method for moving an optical element in an actuation direction, comprising:
   a) providing an actuator mechanically coupled to the optical element, the actuator comprising a ferromagnetic G-shaped first frame having a first large air gap and including a core surrounded partially by a first conductive coil, a first arm and a second arm, each arm having an operative surface and an end surface, the first large air gap being between the first and second arms, the actuator further comprising a ferromagnetic first member nested between the first arm and the second arm and having two, first and second operative surfaces, each first member operative surface facing a respective operative surface of the G-shaped first frame arm across a respective smaller air gap; and
   b) generating an electromagnetic force by forming a magnetic field in a magnetic circuit that includes the first member and at least part of the G-shaped first frame such that the large air gap is either by-passed or bridged through at least one of the smaller air gaps, the electromagnetic force being generated to move the optical element in the actuation direction.

2. The method of claim 1, further comprising:
   c) providing a ferromagnetic second member rigidly coupled to the first member, the second member having a respective operative surface and facing the second arm, the second member and the second arm disposed such that a second small air gap and an overlap are formed between their respective operative surfaces, wherein the second small air gap is smaller than the first large air gap.

3. The method of claim 2, wherein the first and second members form a ferromagnetic ring nested inside the first frame.

4. The method of claim 2, further comprising:
   d) providing a ferromagnetic second frame that includes a second frame core surrounded partially by a second conductive coil, the second frame having first and second frame arms separated therebetween by a second large air gap, each second frame arm having at least one operative surface and an end surface, wherein the first member faces a first pair of arms formed by a first frame arm and a second frame arm, wherein the second member faces a second pair of arms formed by a first frame arm and a second frame arm, each of the first and second members and their respective facing pairs arms disposed such that a small air gap and an overlap are formed between their respective operative surfaces, wherein each small air gap is smaller than either the first or second air gaps, and
   e) causing each member and its respective pair of arms to undergo a relative movement by generating a magnetic force induced by electrical currents in each of the first and second coils, the movement convertible into a displacement of the optical element from a first position to a second position.

5. The method of claim 4, wherein the first and second frames are dimensioned to provide an internal open space that can accommodate the optical element.

6. The method of claim 4, wherein the first and second frames and the first and second members are curved.

7. The method of claim 4, wherein the arms of each frame are substantially perpendicular to each other, wherein the first and second large air gaps are formed between end surfaces of a first frame arm and of a second frame arm, and wherein the first and second members are L-shaped.

8. The method of claim 4, wherein the first and second frame arms are coplanar.

9. The method of claim 4, wherein the first and second cores and coils are coplanar, and wherein the first frame arms and the second frame arms form an angle $\theta$ with a plane of the respective first and second cores.

10. The method of claim 9, wherein angle $\theta$ is between 0 and 5°.

11. The method of claim 1, wherein the operative surfaces facing each other across the small air gaps are parallel to each other and to a direction of the movement.

12. The method of claim 1, wherein the operative surfaces facing each other across the small air gaps are parallel to each other and form an angle $\phi$ with a direction of the movement.

13. The method of claim 12, wherein angle $\phi$ is between 0 and 5°.

14. The method of claim 1, wherein the operative surfaces facing each other across the small air gaps are non-parallel and form an angle $\phi$.

15. The method of claim 14, wherein angle $\phi$ is between 0 and 5°.

16. The method of claim 1, wherein the displacement ranges between 0 and approximately 1000 µm.

17. The method of claim 1, wherein the optical element is a lens assembly.

* * * * *